H. H. DUNCAN AND C. C. WILLOUGHBY.
LOCK AND SEAL FOR CAR DOORS.
APPLICATION FILED AUG. 9, 1920.
1,398,094.
Patented Nov. 22, 1921.
3 SHEETS—SHEET 1.
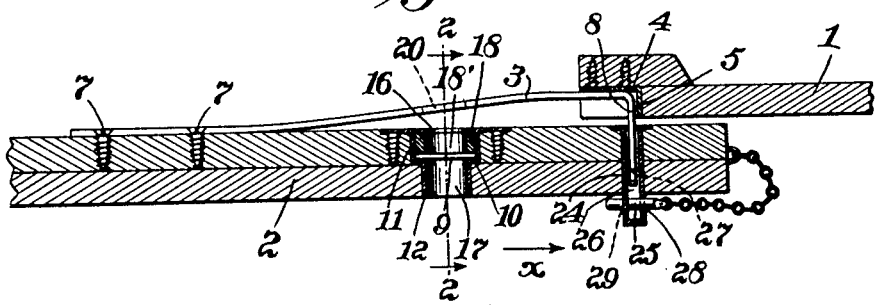
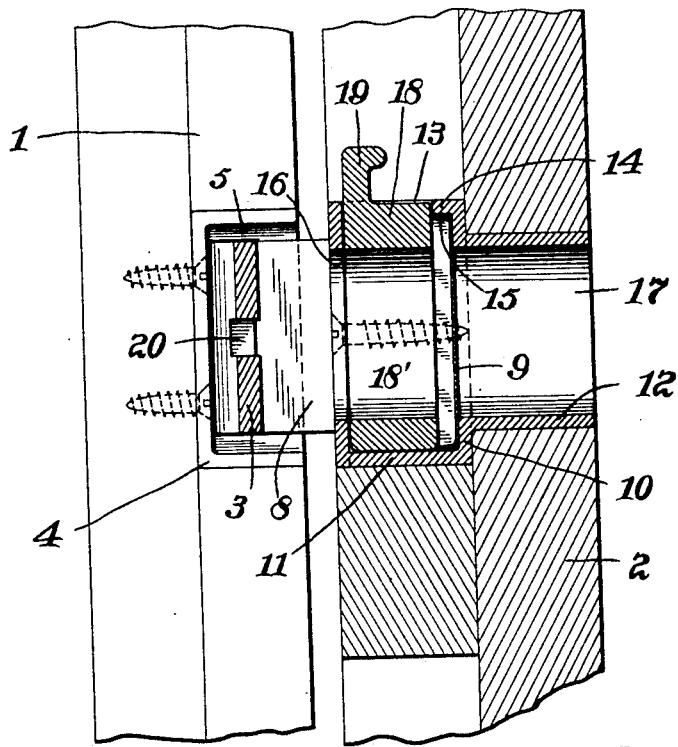
Inventors:
Hayes H. Duncan,
Cleveland C. Willoughby,
by Spear, Middleton, Donaldson & Wall
Attys.

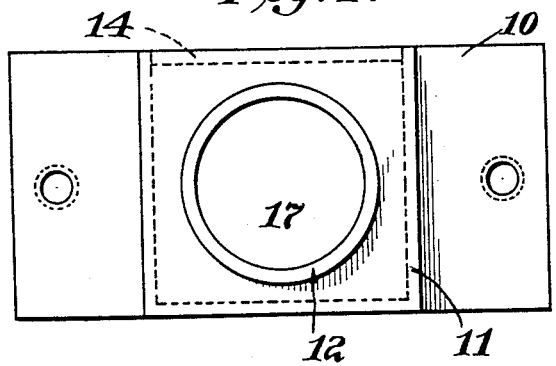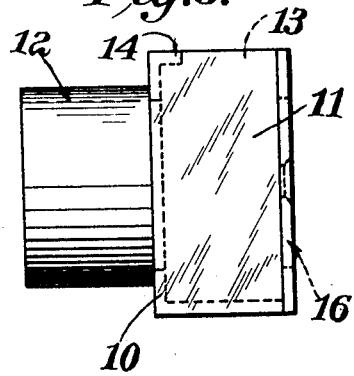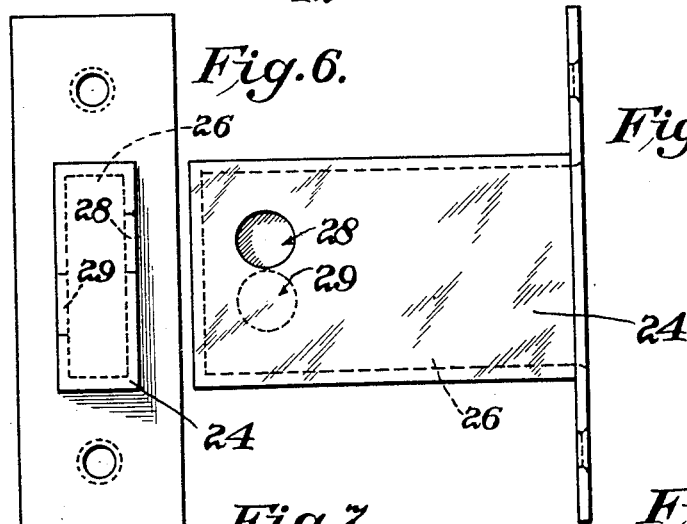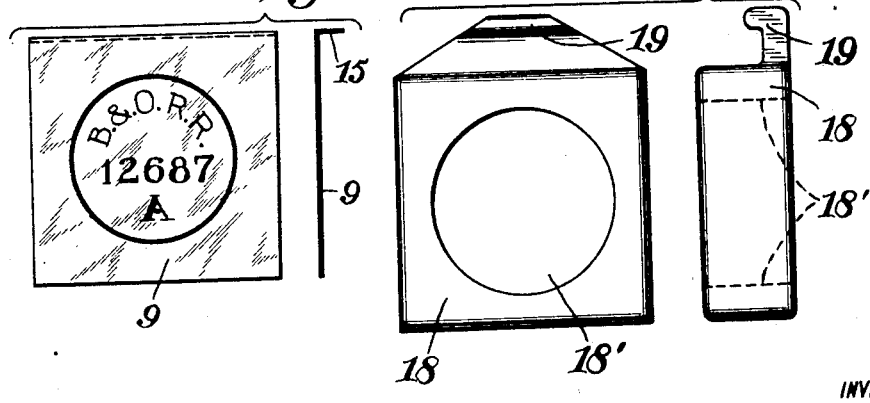

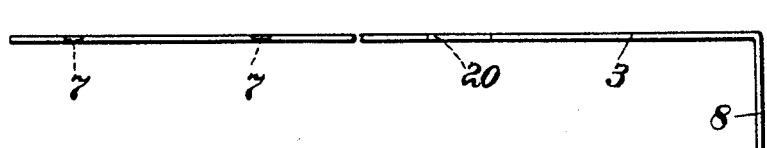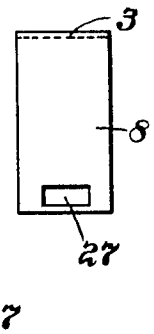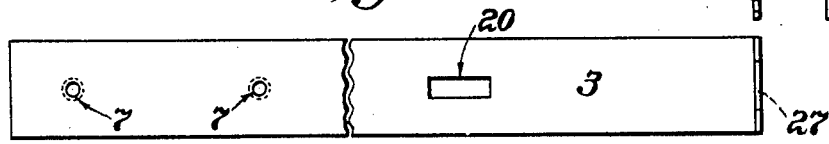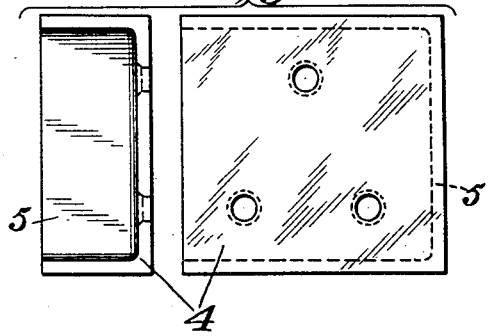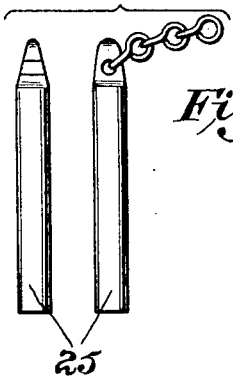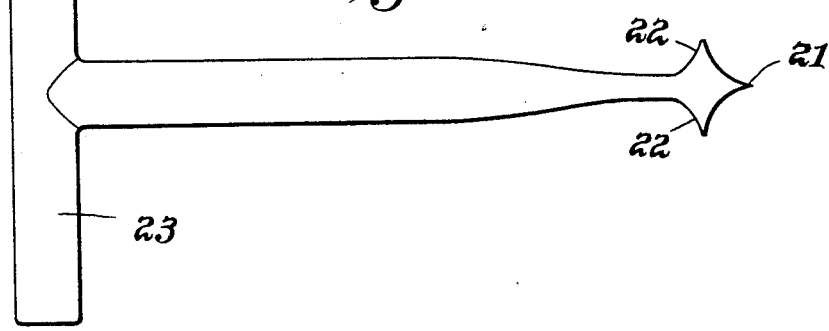

UNITED STATES PATENT OFFICE.

HAYES H. DUNCAN AND CLEVELAND C. WILLOUGHBY, OF PHILADELPHIA, PENNSYLVANIA.

LOCK AND SEAL FOR CAR-DOORS.

1,398,094.  Specification of Letters Patent.  Patented Nov. 22, 1921.

Application filed August 9, 1920. Serial No. 402,165.

*To all whom it may concern:*

Be it known that we, HAYES H. DUNCAN and CLEVELAND C. WILLOUGHBY, citizens of the United States, and residents of Philadelphia, Pennsylvania, have invented certain new and useful Improvements in Locks and Seals for Car-Doors, of which the following is a specification.

One object of the invention is to provide a simple form of lock of automatic character arranged on the inner side of the door and a seal device which also is arranged on the inner side of the door. The invention is shown in the accompanying drawings in which:

Figure 1 is a sectional plan view of a portion of a door and the adjacent car wall with our improvements in place.

Fig. 2 is a vertical sectional view substantially on the line 2—2 of Fig. 1.

Fig. 3 is a side elevation of the seal holder.

Fig. 4 is a front view of the seal holder.

Fig. 5 is a side view of a guide for the end of the locking device.

Fig. 6 is a front view of the part shown in Fig. 5.

Fig. 7 is a front view and an edge view of the seal.

Fig. 8 is a front view and a side view of the retaining member for holding the seal in its holding device.

Fig. 9 shows in side elevation and in end view a wear plate for the end of the locking spring.

Fig. 10 illustrates the holding pin of the locking device.

Fig. 11 is a view of the key for operating the locking device and also puncturing the seal.

Fig. 12 shows an edge view of the locking device. Fig. 13 shows a front view, and Fig. 14 shows an end view of the same.

In these drawings 1 indicates a portion of the car wall and 2 a portion of the door. Fig. 1 shows the door in closed position and locked. It opens by sliding it in the direction of the arrow *x*. It is held locked by a member 3 which automatically engages a keeper or wear plate 4 secured to the car wall, this keeper presenting a shoulder at 5 against which the end of the locking member engages. This locking member operates automatically and as a simple form of such member, we show a leaf spring which is secured at 7 to the inner side of the door and having its end at 8 bent substantially at right angles to the main portion so as to engage the keeper when the door is closed. This engagement takes place automatically, the member 3 acting by its spring quality to throw the bent end 8 into the keeper and thus assume locking position. There is some clearance between the door and the wall of the car which, when the locking member is drawn outwardly into its unlocked position, will prevent the rubbing of the locking member upon the outer side of the car wall and abrading it. The seal which we have provided is a member 9 of any suitable material such as tin, or other material which may be readily punctured or ruptured, and this seal, which is in the form of a plate, is located within the holder 10 consisting of a box-like member 11 and a rounded portion 12. This seal holder is arranged within the limits of the car door, the face of its box-like portion being flush with the inner side of the door and the cylindrical portion 12 reaching through the outer face of the car door.

The box-like member has an open top at the point 13 and a short overhanging flange 14, this construction permitting the seal plate to be placed in position within the box-like member and under the overhanging flange 14. The seal plate has a flange 15 at its upper edge to underlie the flange 14 of the holder so that this seal cannot be displaced upwardly by inserting an instrument through the outer cylindrical end of the holder. The inner side of the seal holder has an opening at 16 in line with the outer opening in the cylindrical portion, which latter opening is indicated at 17. When the seal plate is in place it lies across the opening through the holder but is visible from the outside of the car door so that the inscription on the this plate is clearly visible.

The seal plate is maintained in the holder by a locking block 18 which is provided with a finger piece 19 and is of such width as to fill the space between the overhanging flange 14 and the inner wall of the holder. This locking block is provided with an opening 18' which is in line with the openings 16 and 17. This locking block keeps the seal plate from displacement and together with the overhanging flange prevents any unauthorized person from lifting it by inserting an instrument through the opening 17.

As before indicated, the construction is such that the seal plate is inserted from the inside of the car and this is true also of the locking block 18.

An elongated opening 20 is formed in the stem portion of the locking member and this is located in line with the openings through the seal holder and the retaining or locking block 18 and an attendant who is provided with a key, such as is shown in Fig. 11, can thrust the pointed end 21 of this through the seal plate and through the opening 20 of the locking member and then by giving the key a quarter turn, the shoulders 22 thereof will engage the locking member above and below its slot and on the inner side thereof, so that by exerting a pull outwardly, the locking member may be pulled outward to disengage its end 8 from the locking shoulder 5 on the car wall and then the door may be opened by sliding it in the direction of the arrow $x$. In this action, the seal is necessarily ruptured and after the key is withdrawn, the seal will indicate that the door has been unlocked. Of course, it will be understood that the key is held only by an authorized person. It is provided with any suitable handle as at 23.

At 24 we show a guide member for the end 8 of the spring lock, this guide member also in coöperation with a pin 25 serving as means for retaining the spring member 3 in its unlocked position.

When the spring member is drawn outwardly by means of the key, its outer end moves along the opening 26 of the guide member and when its perforation 27 alines with perforations 28 and 29 of the guide a pin 25 is inserted through these alining openings and thus the locking member will be held in its unlocked position. The opening 28 is in a higher plane than the opening 29 so that when the pin 25 is inserted, it will incline downwardly and will be held against displacement both by gravity and by the reaction of the spring.

When the car door is locked, the pin may be inserted by the workman through openings 28 and 29, and as before stated, it is in inclined position and will be so held by gravity and will be within easy reach of the attendant for use when he unlocks the door. This pin 25 also performs the function of serving as a stop for limiting the outward movement of the end of the spring member so that in case of any shifting of the goods within the car and a movement of the locking member outwardly, the pin will prevent such an extent of this movement as would serve to unlock the car, in other words, the pin by limiting the outward movement of the engaging end 8, prevents this end from being released from the shoulder 5.

It will be seen from the above that both the block and the seal are on the inside of the car door and the seal is in effect embedded within the thickness of the car door, and it is protected in every way against accidental damage or intentional displacement.

The form of the parts may be altered and it will be understood that the drawing and description are illustrative of the general principles of the invention and are not to be regarded as restricting it to the details shown and described.

It will be seen that the seals are easily applied by simply dropping them into the open top holder. Being formed of sheet metal they are of economical manufacture by simply stamping them out.

They may be of various forms and may be nested when stored.

We claim:

1. In combination with a car door having an opening to receive a key; a perforated holder on the inside of the door to receive a seal to obstruct the opening, means for retaining the seal within said holder, and a lock on the inside of said door operable by a key inserted through said opening after the seal is ruptured, said holder having an open top with an overhanging flange to receive the seal beneath it, said retaining means being a block fitted to the holder to retain the seal under said flange, substantially as described.

2. In combination with a car door, a lock on the inner side of the same, a seal obstructing a key hole leading through the door to said lock, and means for locking the seal in place on the inner side of the door, substantially as described.

3. In combination with a car door, a lock on the inner side to engage the end of the car wall, means for operating the lock from the outside of the door, and a seal for obstructing the use of said means, said seal being on the inner side of the door, substantially as described.

4. In combination with a car door, a lock on the inner side thereof, said door having a key hole leading therethrough for the insertion of a key to work the lock, means on the outside of the door to prevent the lock being accidentally released, said means also serving to hold the lock in released position, substantially as described.

5. In combination with a door, a spring member on the inner side of the door having a bent end to engage the car side to lock the door, said door having a key hole through which the lock may be manipulated, a guide for the bent end of the lock, and a pin inserted through the guide and the bent end for holding the lock released, and adapted to act as a stop for the lock to prevent its release, substantially as described.

6. In combination with a door for a car, a spring locking member on the inner side of said door having a portion adapted to extend through an opening in the door and means on the outer side of the door for holding the said locking means in unlocked position, substantially as described.

7. In combination with a door for a car, a spring locking member on the inner side of said door having a portion adapted to extend through an opening in the door and means on the outer side of the door for holding the said locking means in unlocked position, said means including a pin with means for holding it in inclined position, the said pin engaging the outwardly extending portion of the lock, substantially as described.

8. In combination, a car door having an open topped pocket, a flanged seal plate, means for holding the flanged plate in the socket, a lock for the door, said door having a key hole obstructed by the seal, substantially as described.

In testimony whereof, we affix our signatures.

HAYES H. DUNCAN.
CLEVELAND C. WILLOUGHBY.